Aug. 9, 1955 I. LUTZ ET AL 2,715,161
TELEPHONE DEVICE
Filed Dec. 31, 1952
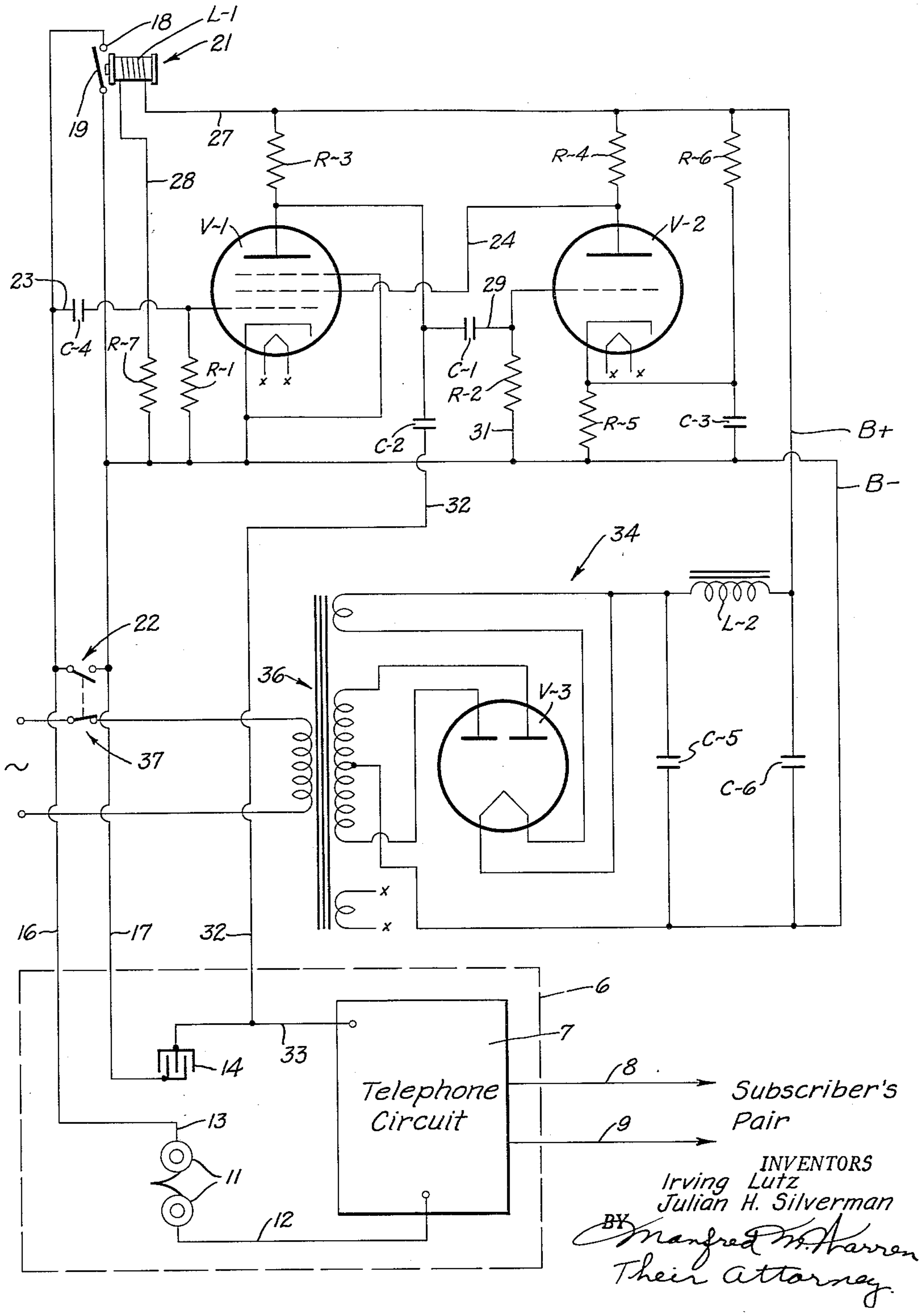
INVENTORS
Irving Lutz
Julian H. Silverman
BY Manfred M. Warren
Their Attorney

United States Patent Office 2,715,161
Patented Aug. 9, 1955

2,715,161

TELEPHONE DEVICE

Irving Lutz and Julian H. Silverman, Oakland, Calif.; said Silverman assignor to said Lutz Application December 31, 1952, Serial No. 328,896

5 Claims. (Cl. 179—84)

The invention relates to telephone apparatus and, more particularly, to automatic information transmitting devices used in connection therewith, such as arrangements for advising time, busy lines, answering and taking of messages and the like.

An object of the present invention is to provide a device of the character described which may be conveniently operated by or at the request of a subscribed and which will enable a subscriber to take his telephone out of normal operation for a desired period of time while sleeping or resting, or the like, and to prevent, during such period, the ringing of the telephone bell, while at the same time advising the caller that the person called desires not to be disturbed, and yet providing for the putting through of the call at the conclusion of the delay period, if the caller considers his call an emergency or of sufficient importance to disturb the person being called.

Another object of the present invention is to provide a device of the character above which may be incorporated in existing telephone apparatus and circuits and which will be fully automatic and may be put into and out of operation at will by the subscriber.

The invention possesses other objects and features of advantage, some of which, with the foregoing, will be set forth in the following descriptions of the preferred form of the invention which is illustrated in the drawing accompanying and forming part of the specification. It is to be understood, however, that variations in the showing made by the said drawing and description may be adopted within the scope of the invention as set forth in the claims.

The drawing is a schematic electrical diagram of a telephone device constructed in accordance with the present invention and shown operatively connected to existing telephone apparatus.

The telephone device of the present invention consists briefly in means adapted for connection in the bell ringing circuit of a subscriber's telephone to prevent, during the period of operation of the device, and after initiation of a call, a ringing of the bell, together with means simultaneously introducing into the circuit and audible at the caller's station, a signal advising the caller that the person being called desires not to be disturbed, and, lastly, timing means coacting with the foregoing means and functioning after the duration of a predetermined period and a continuance of said bell ringing signal as controlled by the persistence of the caller to render inoperative the first described means and restore normal bell ringing operation. In this manner the caller will be advised that the person called desires not to be disturbed, but if the caller considers his call an emergency or of sufficient importance to disturb the person called, the caller need only persist in holding open the circuit and the continuance of the ringing signal and, after the above described delay period, the circuit will be automatically completed and the call put through.

A variety of devices and circuits may be adopted for accompanying the present invention both at the subscriber's station or the central office, or a combination of both. The information signal given to the caller may be in the form of a recorded voice or any other audible signal conveying a message of similar import to the caller. The device illustrated in the accompanying drawing has been selected for present purposes because of its simplicity for illustration and because it may be incorporated in the receiver's station without essentially altering the existing telephone apparatus or circuits.

In the accompanying drawing, the existing telephone apparatus is illustrated within the dash line 6 and includes the subscriber's receiving and transmitting set 7 connected to lines 8 and 9 labeled "subscriber's pair," which are in turn connected to central office apparatus. As part of the set 7 and here illustrated separately is the ringing circuit including bell 11 having one side connected to the set by conductor 12 and normally connected at the other side to the set by conductor 13 through a capacitor 14. In the present device, the line 13 is opened and there is inserted therein by way of conductors 16 and 17 the contacts 18 and 19 of a solenoid operated relay switch 21 forming part of the present device which is illustrated generally above the dash line 6. There is, accordingly, placed across the conductors 16 and 17 a switch 22 which may be closed when normal telephone operation is desired or opened in operating the present device.

The incoming ringing signal, which consists of pulses of alternating current, is applied by way of conductor 23 and condenser C–4 to the input grid circuit of a two-valve transition relaxation flip-flop trigger oscillator. The application of this input potential to the grid of the first valve V–1 results in the grid of the second tube V–2 being driven positive, thus causing anode current to flow in valve V–2, which is normally biased to or beyond plate current cut-off. This flow of anode current causes a voltage drop through resistor R–4 and, in turn, depresses the screen voltage of valve V–1, which is connected to the plate of valve V–2 by conductor 24 so that the grid of valve V–2 is held positive during and after the cessation of the short duration exciting signal.

The coil L–1 of the solenoid-operated relay switch 21 is connected by conductors 27 and 28 in parallel relation to the plate circuit of valve V–1 with conductor 27 being connected to plate resistor R–3 at the B+ line and conductor 28 being connected to B—, through resistor R–7. The value of resistor R–7 is chosen so as to act in conjunction with the resistance of the coil and other cooperative electronic components to energize the coil L–1 sufficiently to overcome the normal spring bias of contacts 18 and 19 to open position to thereby cause a closing of these contacts under what may be designated as a normal or stable regime of the circuit illustrated. The flip-flop characteristics of the circuit are determined so that the first impulse of an incoming ringing signal alters the balance of current flow in the plate circuit of valve V–1, in effect shunting relay coil L–1 and thus opening the contacts 18 and 19. This occurs instantaneously with the first impulse of the ringing signal and before ringing of the bell. At the same time coupling capacitor C–1, connected by conductor 29 between the plate of valve V–1 and the grid of valve V–2, is charged. This first impulse operates to "flip" the circuit into its so-called unstable regime. The period of this regime is determined by the time constant of capacitor C–1 and grid resistor R–2, which is connected by conductor 31 between capacitor C–1 and B—. During this unstable regime, feedback is effected between the plate of valve V–2 and the screen of valve V–1, via conductors 24, and there is thus established a blocking oscillator which, by the choice of suitable circuit constants creates a signal tone which can be superimposed upon the calling line through a small capacitor C–2, here connected by conductor 32 between conductor 29 and conductor 33, forming part of the bell ringing circuit of the set 7. The import of this signal tone is to advise the caller that the person being called desires not to be disturbed, as above described, and that the call should be placed again at a later time.

If the caller considers his call an emergency or of sufficient importance to disturb the person being called, he merely persists in keeping open the line and continuing the ringing signal. In due course the flip-flop circuit is returned to the normal condition by the discharge of the coupling condenser C–1 to a predetermined value whereupon the contacts 18 and 19 will be closed to complete the ringing circuit through the bell 11, causing the bell to ring normally. As will be understood, the circuits may be caused to return to normal and the contacts closed when C–1 discharges to a certain pre-determined value of its original charge. This value is normally 0.707 of the original voltage but any percentage can be used by a suitable choice of circuit parameter. The residual charge then remaining on C–1 decaying in an asymptotic manner, together with the space charge on the grid of valve V–2, is sufficient to prevent triggering of the system for a time period of several times the duration of the unstable regime as determined by the discharge of condensor C–1 to the predetermined charge of, say, 0.707 of its original voltage.

Any suitable power supply may be used for energizing the tubes, such as the conventional transformer, rectifier and filter circuit 34 illustrated. This circuit includes a transformer 36 having secondary windings providing the B+ voltage and the filament voltage for the valves V–1 and V–2, both controlled from a single primary winding having a power switch 37, connected therein. Energizing of the device may, accordingly, be effected by closing of switch 37. Preferably this switch is ganged in its operation with switch 22 in an arrangement whereby switch 22 will be closed when switch 37 is opened and switch 22 opened when switch 37 is closed.

Other circuit components illustrated in the drawing include grid resistor R–1 for valve V–1, bias resistor R–5 and bypass condensor C–3 for valve V–2 and resistor R–6 in the plate cathode circuit of valve V–2. The power supply includes rectifier tube V–3, choke L–2 and filter condensor C–5 and C–6. The filament winding of transformer 36 is indicated as connected to the filaments of valves V–1 and V–2 by the usual notation *x—x*.

While a two-valve transition relaxation flip-flop trigger oscillator has been adopted for present purposes, it will be understood by those skilled in the art that a single, multi-purpose electronic tube of appropriate design may be substituted for the two valves V–1 and V–2, that a system of relays may be evolved in lieu of electronic operation, that the advising signal may be supplied in the form of a recorded voice or oscillator in the central office apparatus, and that other variations of apparatus and circuitry may be adopted by those skilled in the art in the practice of the present invention.

We claim:

1. In telephone apparatus including a subscriber's bell ringing circuit and bell therein, first means adapted for connection in said circuit and being responsive to an incoming ringing signal to open the circuit to and thereby prevent ringing of said bell, second means coacting with said first means to introduce an advising signal into said circuit, and timing means functioning after the duration of a predetermined time to render inoperative said first and second means and restore bell ringing operation.

2. In telephone apparatus including a subscriber's bell ringing circuit and bell therein, first means adapted for connection in said bell ringing circuit and being responsive to an incoming ringing signal and being operated thereby to open the circuit and prevent the ringing of said bell, second means coacting with said first means to introduce an advising signal into said circuit, and timing means triggered by said incoming ringing signal and functioning after the duration of a predetermined time to render inoperative said first and second means and restore bell ringing operation.

3. In a telephone apparatus including a subscriber's bell ringing circuit and bell therein, a relay switch adapted for connection in said bell ringing circuit, means adapted for connection to said circuit and being responsive to an incoming ringing signal to open said switch to prevent the ringing of said bell, means coacting with said first named means to introduce an advising signal in said circuit, and timing means functioning after the duration of a predetermined time to render inoperative said first and second named means to effect a closing of said switch and restoration of bell ringing operation.

4. In telephone apparatus including a subscriber's bell ringing circuit and bell therein, first means adapted for connection in said bell ringing circuit and functioning to intercept an incoming ringing signal and being operated thereby to prevent the ringing of said bell, electric oscillator means adapted for connection to said circuit and being activated by said incoming ringing signal to introduce an advising signal into said circuit, and timing means functioning after the duration of a predetermined time and the continuance of said ringing signal to render inoperative said first and second named means and to restore bell ringing operation.

5. In a telephone apparatus including a subscriber's bell ringing circuit and bell therein, a relay switch adapted for connection in said bell ringing circuit, means adapted for connection to said circuit and being responsive to an incoming ringing signal to open said switch to prevent the ringing of said bell, electric oscillator means adapted for connection to said circuit and being activated by said incoming ringing signal to introduce an advising signal into said circuit, and timing means connected to said first and second named means and energized by said incoming ringing signal functioning after the duration of a predetermined time and the continuance of said ringing signal to render inoperative said first and second named means to effect a closing of said switch and restoration of bell ringing operation.

References Cited in the file of this patent

UNITED STATES PATENTS

| | | |
|---|---|---|
| 2,481,840 | Hardgrave | Sept. 13, 1949 |
| 2,531,221 | Kent | Nov. 21, 1950 |